March 27, 1945.   A. C. GODDARD   2,372,374
ROTARY RECESS MILLING DEVICE
Filed Jan. 24, 1944   2 Sheets-Sheet 1

INVENTOR.
ASA C. GODDARD
BY
Frank H. Harmon
ATTORNEY

March 27, 1945. A. C. GODDARD 2,372,374
ROTARY RECESS MILLING DEVICE
Filed Jan. 24, 1944 2 Sheets-Sheet 2

INVENTOR.
Asa C. Goddard
BY
Frank H. Harmon
ATTORNEY

Patented Mar. 27, 1945

2,372,374

UNITED STATES PATENT OFFICE 2,372,374

ROTARY RECESS MILLING DEVICE

Asa C. Goddard, Mentor, Ohio, assignor, by mesne assignments, to Jack & Heintz, Inc., Cleveland, Ohio, a corporation of Ohio Application January 24, 1944, Serial No. 519,521

4 Claims. (Cl. 90—20)

This invention relates in general to metal working machines and more particularly to improvements to rotary recess milling devices.

One of the primary objects of the present invention is to provide an improved tool and work holder attachment for internal milling and means for insuring uniform milling and limiting the depth thereof to a predetermined extent.

A further object is to provide in such an attachment a suitable center device for the milling cutter, a central operating shaft for rotating the cutter and a gear train, and including an idler gear for positioning the work to a predetermined degree of eccentricity with respect to the cutter and to rotate the work at a desired gear ratio in an opposite direction to insure uniform internal milling to the desired depth.

With the foregoing and other objects in view, the invention resides in the combination of parts and in the details of construction hereinafter set forth in the following specification and appended claims, certain embodiments thereof being illustrated in the accompanying drawings, in which:

Figure 1:
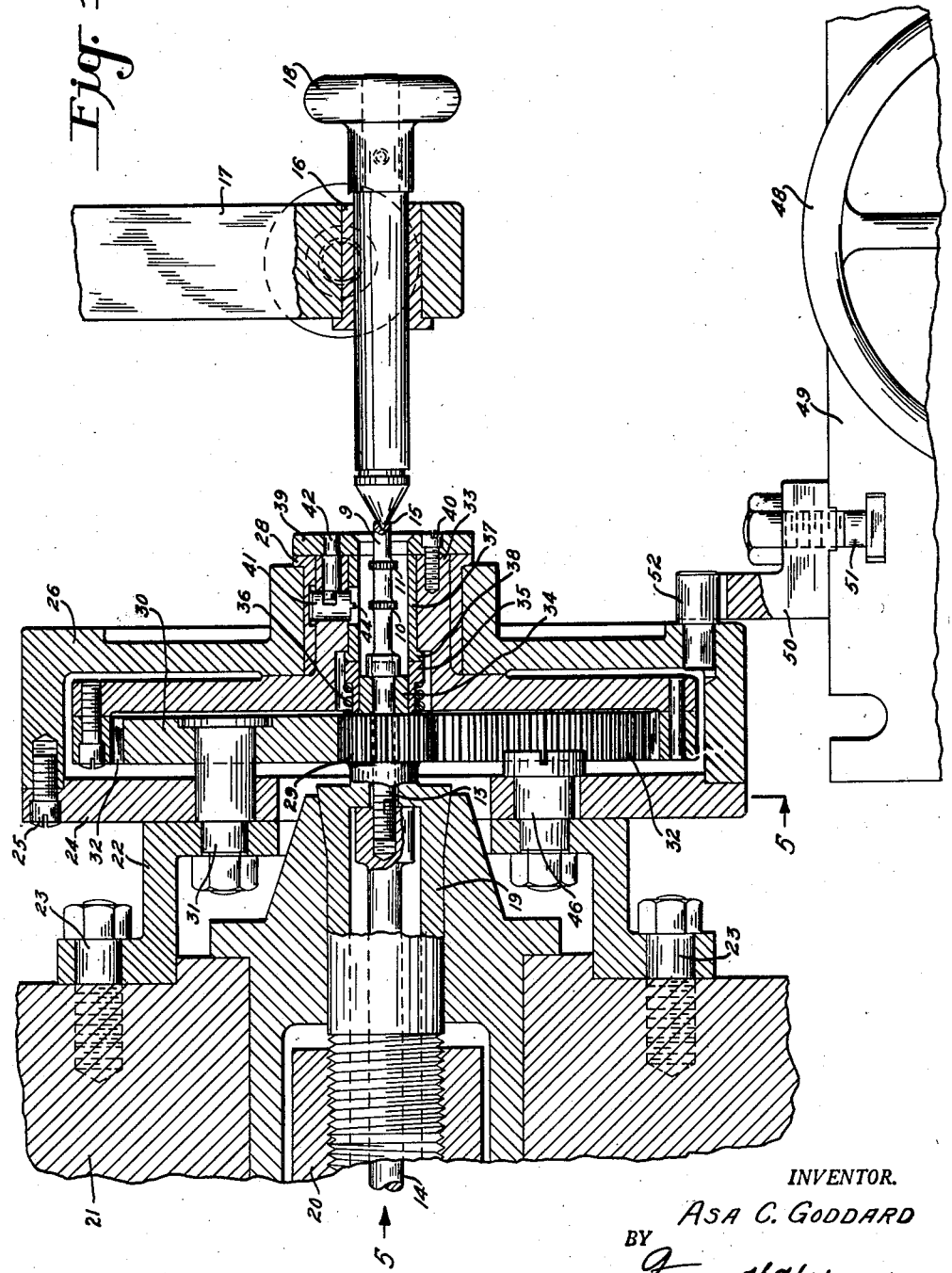
Figure 1 is a view in vertical section taken through the attachment showing the milling tool and the holders for tool and work, as well as the centering device, tool shaft and gear train for eccentrically driving the work.

Before referring in detail to the drawings, it is to be borne in mind that one of the primary objects is to provide a suitable attachment for internal milling. As an example of the work to be machined, there is illustrated in the drawings a hollow cylindrical brass or bronze bushing 1 which is of the construction shown in the co-pending application of Ralph M. Heintz, Serial No. 462,536, filed October 19, 1942, assigned to Jack & Heintz, Inc., and having a hollow bore 2 with radially extending slots 3, 4 and 5. As viewed in Figure 2, the milling operation desired is to internally mill, to a predetermined depth, the bushing in alignment with the second and fourth peripheral grooves 6 and 7. The depth of the milling operation in the finished work is illustrated at 8 in the sectional view in Figure 6.

In order to obtain this double simultaneous milling there is provided a tool 9 with two predeterminedly spaced cutters 10 and 11. This tool is provided with a collar 12 for releasable driving engagement with a stub shaft 13, which in turn is screw-threadedly connected to a driving shaft 14. The tool thus engaged for rotary driving about its own constant axis is centered by a suitable centering device having a point 15 engaging a corresponding recess in the end of the tool. The centering device may be carried in a bushing 16 in a support 17 and be linearly adjusted by a hand knob 18.

The shaft 13 is carried within a barrel shaft 19 which is screw-threadedly connected to a driving member 20 of the rotating chuck 21. The chuck is provided with an outer housing including a spaced collar 22 bolted at 23 to the chuck. The outer housing further includes a plate 24 bolted at 25 to a collar 26 including a flange 27 to receive a bushing 28.

Simultaneous with the rotation of shaft 14, the sleeve 19 is also rotated by the chuck driving member 20. Sleeve 19 carries a relatively small central driving gear 29, which in turn meshes with a relatively larger idler gear 30. This idler gear is mounted to rotate upon a stub shaft 31, which latter extends through housing members 22 and 24. Idler gear 30, in turn, meshes with an internal gear 32 to which is secured a flange 33 that rotates within bushing 28, the latter acting as a bearing.

As stated before, Figure 1 shows the attachment device without the work. Surrounding the hub 34 of gear 29 is a sleeve 35 spring pressed outwardly by a compression coil spring 36 to abut a corresponding internal sleeve 37 having a shoulder 38 engaging a corresponding shoulder on the internal gear flange 33. Bushing 37 is further maintained in place by the centrally apertured cover plate 39 bolted at 40 to the flange 33.

When it is desired to insert the work, such as the bushing 1 for an internal milling operation, the centering device is withdrawn from the tool. The bushing 1 is then inserted within bushing 37 to surround the tool 9 and its cutters 10 and 11 and out of contact therewith. In order to releasably lock the bushing in position to be rotated by the internal gear 32 and to also lock bushing 37 to be rotated with the internal gear flange 33, there is provided a locking member 41 which is vertically slidably mounted through bushing 37, sleeve 33 and into a recess in bushing 28. Flange 33 is further provided with a longitudinal opening 42 to receive a positioning and locking pin 43 which also extends into a corresponding opening in the locking member 41. As the pin 43 is inserted after the work is installed, the locking member is forced downwardly into the position shown in Figure 2, in which the upper extremity of locking member 41 is removed from slot 45 in bushing 28 and projection 44 of locking member 41 engages slot 6 of the work to insure the rotation of the work as internal gear 32 is rotated.

Figure 2:
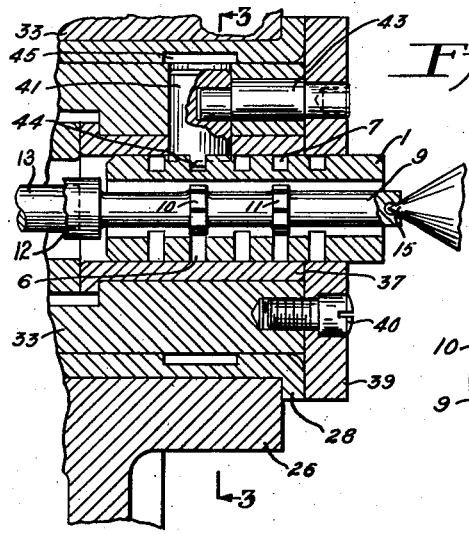
Figure 2 is a fragmentary view in similar section showing the work being engaged by the tool.
Figure 3:
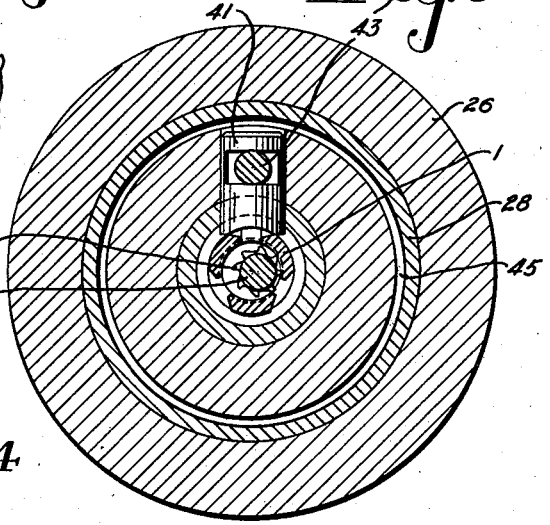
Figure 3 is a view in section taken along line 3—3 of Figure 2 showing the work in eccentric relationship with respect to the tool and engaged thereby and also showing the work retaining locking member.
Figure 4:
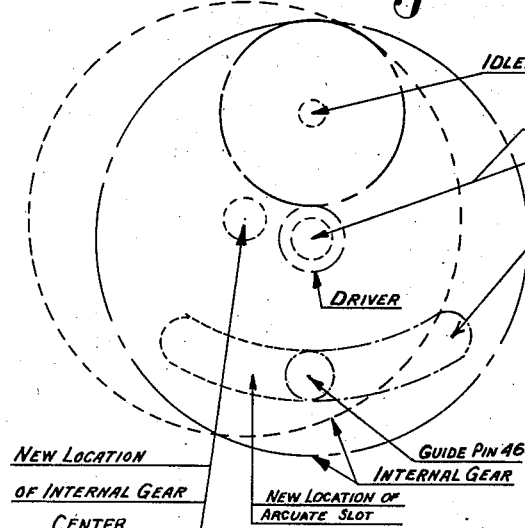
Figure 4 is a geometrical illustration of the planetary gear train showing the constant centers of the driving and idler gears and the shifting centers of the internal gear.
Figure 5:
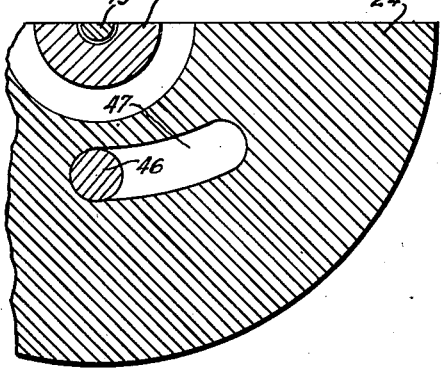
Figure 5 is a partial view in section taken along line 5—5 of Figure 1.

With the work thus inserted and centered, the cutters are free of the inner surface of the work. In order to bring the cutters into engagement with the work, the housing wall 24, as before stated, is secured to housing member 22 by pin 31. These two housing members 24 and 22 are also connected to each other by means of a bolt 46, but wall 24 is provided with an arcuate slot 47 of predetermined length to permit the housing members 24 and 26 to be bodily moved about pin 31 as a pivot. This pin 31, being the axis of pivot of housing 24, is also coincidental with the axis of rotation of internal gear 32. The engagement of the pin 46 with one end of arcuate slot 47 may act as a limit of movement of housing 24 to position it concentrically as shown in Fig. 2 and in broken lines in Figure 4, while engagement of pin 46 with the other end of arcuate slot 47 acts as a limit of movement to determine the desired eccentricity of relationship between the new shifted location of the housing, and consequently the internal gear 32 that drives the work, with respect to the center driving shaft 13 that drives the cutters in order to bring the cutters into milling engagement with the work. This shifted eccentric position is shown in Figure 3 and in dotted lines in Figure 4. This shifting of the housing with the internal gear may be manually accomplished by a turning of a hand wheel 48 in either direction to move a support 49 and bracket 50 which is secured to support 49 by a pin 51 and to housing 26 by a pin 52. The limit of movement of travel or manual adjustment of housing 24 may be adjustably set and determined inside the limits of the two ends of the arcuate slot 47 by any suitable means, if desired.

Figure 6:
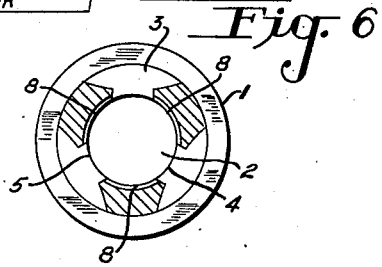
Figure 6 is a view in cross section taken through the finished work showing the latter to have an internally milled groove therein.

From the foregoing, it will be seen that there has been provided a milling attachment, work holder and centering device which insures the concentric rotation of the milling tool and its dual spaced cutters. There is provided a work holder for readily receiving and removably locking the work in place about the milling tool but out of engagement therewith. There is also provided a gear train drive between a center gear carried by the tool driving shaft, the gear train including an internal gear which is bodily shiftable with its housing to a predetermined degree of eccentricity and driven at a predetermined ratio of speed of rotation with respect to that of the tool driving shaft. This brings the two cutters into engagement with the work at predetermined spaced points of the inner surface of the work. This eccentric relationship between the cutters and the work is shown in Figure 3 and Figure 6 shows the depth 8 of the milling operation in the work in alignment with the peripheral grooves 6 and 7 of Figure 2.

I claim:

1. In a machine tool attachment, a cutting tool having a plurality of predeterminedly spaced cutters, a drive shaft for rotating the same concentrically, a work holder for supporting said work concentrically about said tool and out of engagement therewith, a driving gear carried by said drive shaft, a gear train driven by said driving gear and including an internal gear, said work holder being driven by said internal gear, and means for shifting said work holder and internal gear to a predetermined degree of eccentricity with respect to said tool for bringing the latter into engagement with the inner surface of said work for internal milling operation to a predetermined depth in said surface.

2. In a machine tool attachment, a cutting tool and a drive shaft for rotating the same concentrically, a work holder for supporting said work concentrically about said tool and out of engagement therewith, a driving gear carried by said drive shaft, a gear train of relatively greater gear ratio driven by said driving gear and including an internal gear, said work holder being driven by said internal gear, and means for shifting said work holder and internal gear to a predetermined degree of eccentricity with respect to said tool for bringing the latter into engagement with the inner surface of said work for internal milling operation to a predetermined depth in said surface.

3. In a machine tool attachment, a cutting tool and a drive shaft for rotating the same concentrically, a work holder for supporting said work concentrically about said tool and out of engagement therewith, a driving gear carried by said drive shaft, a gear train of relatively greater gear ratio driven by said driving gear and including an internal gear, said work holder being driven by said internal gear, a housing for said internal gear and work holder, and means for shifting said housing and the work holder and internal gear to a predetermined degree of eccentricity with respect to said tool for bringing the latter into engagement with the inner surface of said work for internal milling operation to a predetermined depth in said surface.

4. In a machine tool attachment, a cutting tool and a drive shaft for rotating the same concentrically, a work holder for supporting said work concentrically about said tool and out of engagement therewith, a driving gear carried by said drive shaft, a gear train of relatively greater gear ratio driven by said driving gear and including an internal gear, said work holder being driven by said internal gear, a housing for said internal gear and work holder, and means for shifting said housing and the work holder and internal gear to a predetermined degree of eccentricity with respect to said tool for bringing the latter into engagement with the inner surface of said work for internal milling operation to a predetermined depth in said surface and for shifting the same out of eccentricity and said tool out of engagement with said work upon completion of said milling operation.

ASA C. GODDARD.